Oct. 20, 1970 W. PAPKE 3,535,692

SWITCHING MATRIX

Filed April 28, 1967

3,535,692
Patented Oct. 20, 1970

3,535,692

SWITCHING MATRIX

Wolfgang Papke, Socking, near Starnberg, Germany, assignor to Siemens Aktiengesellschaft, Munich, Germany Filed Apr. 28, 1967, Ser. No. 634,660
Claims priority, application Germany, May 4, 1966, S 103,622
Int. Cl. H04q 9/00
U.S. Cl. 340—166 7 Claims

ABSTRACT OF THE DISCLOSURE

A matrix comprising a plurality of associated row and column connection lines wherein a bi-directionally conductive circuit having threshold values of different amplitudes associated with each conductive direction is connected in series with an associated relay device, to selectively effect a complete connection between each row connection line, and a column connection line. The current flow path may be effective from a row connection line to a column connection line, or vice-versa, and either the column connection lines or the row connection lines comprise two parallel connections that are alternatively used depending upon the direction of current flow. The relay device may comprise a bistable relay, actuable between bistable states by application of a control signal of predetermined polarity and amplitude between its associated row and column connection lines.

CROSS REFERENCE TO RELATED APPLICATION

Applicant claims priority from German patent application No. S 103,622, filed May 4, 1966, in Germany.

BACKGROUND OF THE INVENTION

Field of the invention

The invention concerns a matrix comprising a plurality of row and column connection lines. Each row connection line comprises alternate parallel electrical paths, and is connectable to a column connection line through a series connection comprising a relay device and switching means, through one of said paths, depending upon the polarity of the control pulse applied thereto. Further, the control pulse and, more particularly, its polarity, determines the state of the bistable relay. However, the relay devices associated with other row and column connection lines are not affected because the control pulse applied to the row and column connection line of the relay device to be actuated, is prevented from actuating other relay devices since the switching devices associated therewith block said control pulse. The invention has particular use in telephone installations.

Prior art

The prior art teaches the utilization of a matrix comprising a plurality of row and column connection lines, that may be connected through an electrical path comprising a relay device. Switching means are connected in series with the relay device between each row and column connection line, and are actuated in response to a control pulse applied between the inputs to the row and column connection lines, to actuate the associated relay.

To prevent actuation of the other relay devices, the switching device may comprise diodes. Then, parallel connected branches of a particular row and connection line (or column connection line) associated with each relay device must be poled so as to prevent the control pulse from actuating the relay device associated with said parallel branches. This requires that at least one of the diodes associated with the parallel branches of the row and column connection lines between which a connection is to be effected, must be poled to block the control pulse. Therefore, at least three diodes having associated relay devices connected in series therewith between row and column connection lines, must be used. Thus, if row connection line 1 is to be connected to column connection line 1, it is seen that the parallel branch defined by the path comprising a connection between row connection line 1 and column connection line 2; and from column connection line 2 to row connection line 2; and from row connection line 2 to column connection line 1, comprises three individual connection paths, each having a series connected diode and relay device. Thus, at least one of the three individual connection paths, comprising the series connection of the switching means comprising diodes and the relay devices, must block the control voltage. Otherwise, relay devices other than the one associated with row connection line 1, and column connection line 1, will be actuated by the control voltage. It is seen that this system necessitates the utilization of control signals of a predetermined polarity.

It is often desirable to utilize relay devices comprising bistable relays, because these are maintained in a stable operational state without the continuous supply of energy. The bistable relays are returned to the rest position, by a control signal of opposite polarity relative to that required to initiate actuation of the bistable relay to one of the stable states. When the bistable relay comprises only one energization or exciter winding, it is seen that the control signals must be of different polarities. The use of diodes as the switching means is thereby precluded. This problem may be solved, however, by providing an auxiliary circuit such as an auxiliary control winding for each bistable relay. These may be connected in parallel with the diode in response to actuation of the relay by the control pulse. Then, a control pulse of opposite polarity may be applied to the relay through the shunt or parallel path to reset the relay to the rest position.

The prior art also teaches the utilization of switching elements that are conductive in both directions, and which have a relatively high resistance below a predetermined potential threshold and a relatively low resistance above said predetermined potential threshold. For example, varistors, glow lamps, or two series connected, oppositely poled Zender diodes may be used. Then, if said predetermined potential threshold is selected such that it is smaller in amplitude than the difference between the control potential applied between associated row and column connection lines, and the threshold signal necessary to effect actuation of the bistable relay, but is greater in amplitude than one-third of said control potential, only the relay winding in the series path between the selected row and column connection lines is energized. This is because the parallel connected circuits associated therewith, comprise three switching elements connected in series (as explained above), and since one-third of the control potential applied thereacross is less than the potential threshold of each of said three switching elements, said three switching elements effectively block a complete electrical connection and hence no current can flow through the relay windings associated with said parallel circuits. However, this type of circuit requires the use of a relatively large number of switching devices, and hence increase manufacturing costs associated with the matrix.

Another system utilizes an auxiliary row or column connection line providing two parallel paths or connections between the row and column connection lines. A diode is connected between the switching means and each of said two parallel paths, in opposite polarity with respect to the switching means. Thus, electrical connections are completed between the row and column connection lines, through one of said two parallel connection paths, the connection path depending upon the polarity of the control potential. However, a disadvantage of this type of system, is that the number of connection lines and associated contacts required is increased because the parallel auxiliary connection lines must be connected to a central control means that determines the connections to be effected.

SUMMARY OF THE INVENTION

These and other objections and defects of prior art systems are solved by the present invention, which discloses a matrix comprising a plurality of row and column connection lines. Either the row or column connection lines comprise auxiliary connection lines associated therewith. For example, the row connection lines may comprise associated first and second connection lines that are connected to one terminal of a relay device through oppositely poled rectifiers. First and second Zener diodes are connected between the first and second row connection lines, respectively, and a common connection point, in opposite polarity with respect to said common connection point. The other terminal of the relay device is connected to a column connection line. Common connection lines are connected to each of the common connection points, associated with a different row connection line.

Depending upon which of the row and column connection line circuits is completed, through selective actuation of switches connectable thereto, the associated relay device may be actuated. Further, the polarity of the control pulse applied between connected row and column connection lines determines the particular connection that will be effected from the column connection line, through one of the two parallel paths comprising the series connection of the oppositely poled rectifiers and Zener diodes of the first and second row connection lines. Further, parallel circuits associated with the selected row and column connection lines, are not completed, because the Zener diodes associated therewith block the flow of current therein. This is because they are poled nonconductive relative to the applied control pulse. The number of Zener diodes utilized in this circuit, is substantially reduced over prior art systems, because each row connection line which comprises associated first and second row connection lines, share two Zener diodes. Alternatively, the column connection lines, may each comprise associated first and second column connection lines, having parallel paths comprising rectifiers and Zener diodes connected in opposite polarity, thereto, in series with the relay devices. Further, it is not essential that Zener diodes be utilized, and other types of non-linear devices may be substituted therefor. For example, discharge devices such as glow lamps, or varistors, having a parallel connected rectifier such as a diode, may be substituted for the Zener diodes.

Another embodiment of the invention, provides for the elimination of one of the Zener diodes in either one of the associated first and second row connection lines and connection of a common Zener diode in series with the column connection lines. This further reduces the number of Zener diodes required to effect actuation of a bistable relay device having one exciter winding between first and second stable states thereof. Further, said common Zener diode associated with the column connection lines may be deleted, provided the control pulse or potential source may selectively provide control pulses of opposite polarity and different amplitudes to the column and row connection lines. Thus, the invention provides for selective actuation of the bistable relays associated with the matrix comprising the plurality of row and column connection lines between stable states thereof, with a minimum of non-linear switching elements, such as Zener diodes, or other circuits comprising varistors or glow lamps. This substantially reduces the manufacturing cost associated with such matrices, and simultaneously simplifies the circuitry.

BRIEF DESCRIPTION OF THE DRAWINGS

FIG. 2 illustrates examples of alternative switching elements which may be used.

DETAILED DESCRIPTION OF THE INVENTION

Figure 1:
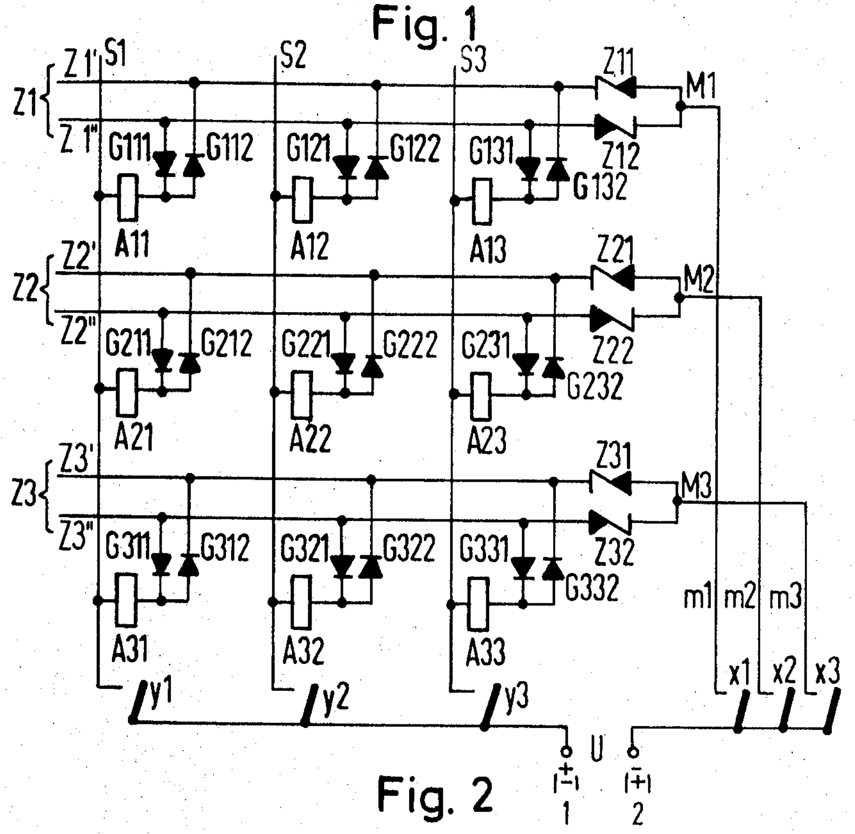
FIG. 1 is an electrical schematic diagram of one embodiment of the invention, wherein each of the associated first and second row connection lines comprises a Zener diode connected therein, in opposite polarity with respect to a common connection point.

FIG. 1 illustrates a matrix comprising a plurality of row and column connection lines. Row connection lines, Z1, Z2, and Z3, comprise associated first and second row connection lines Z1′, and Z1″; Z2′ and Z2″; and Z3′ and Z3″, respectively. Column connection lines S1, S2, and S3 are connected to switches Y1, Y2, and Y3, respectively. The row and column connection lines are selectively energizable by control pulse source U, by completing connections between switches Y1, Y2, and Y3, associated with column connection lines S1, S2, and S3, respectively, and switches X1, X2, and X3, connected with row connection lines Z1, Z2, and Z3, through common connection lines *m*1, *m*2, and *m*3, respectively. Control apparatus (not shown) may effect the desired row-column lines connections.

A series connection comprising a relay device and a diode is connected between each of the column and associated first and second row connection lines. Thus, for example, with reference to column connection line S1, relay device A11, is connected in series with diode G112 between column connection line S1 and first row connection line Z1′. Further, relay device A11 is connected in series with diode G111 (in opposite polarity with respect to diode G112), between column connection line S1 and second row connection line Z1″. Similar series connections comprising a relay device and oppositely poled diodes connected thereto, are provided between each column connection line and the associated first and second row connection lines.

Relay devices A11 . . . A33 preferably comprise bistable relays having an exciter winding associated therewith. One stable condition of the bistable relay may be assumed to be the "on" or operating condition, and the other stable condition may be assumed to be the "off" or rest position.

It is seen that the associated first and second row connection lines are coupled to common connection points. Thus, first and second row connection lines Z1′ and Z1″; Z2′ and Z2″; and Z3′ and Z3″; are respectively connected to common connection points M1, M2, and M3. Further, oppositely poled Zener diodes are connected between the associated first and second row connection lines and the common connection points, in opposite polarity with respect to the latter.

For example, it is seen that Zener diodes Z11 and Z12, are respectively connected to first and second row connection lines Z1′ and Z1″, in opposite polarity with respect to common connection point M1. Zener diodes Z21 and Z22, are respectively connected between first and second row connection lines Z2′ and Z2″, and common connection point M2 in opposite polarity. Zener diodes Z31 and Z32 are respectively connected between associated first and second row connection lines Z2′ and Z2″, and in opposite polarity to common connection point M3. Common connection points M1, M2, and M3, are connected to contact switches X1, X2, and X3, through common connection lines *m*1, *m*2, and *m*3, respectively.

Bistable relays of the type described, may be operated between first and second magnetically stable states conditions. Assuming that the bistable relays have one winding, connected in the series connection between associated row and column connection lines, as described above, it is necessary to apply oppositely polarized control pulses to the winding to effect operation between the first and second stable conditions. That is, it is necessary to magnetically repolarize the bistable relay, to effect actuation between the first and second stable states.

For the purpose of explaining the invention, it will be assumed that a source of control pulses, U applied to the column and row connection lines, such that the column connection line is poled positively and the row connection line is poled negatively, effects operation of the relay to the operate condition. A source of control pulses of opposite polarity, that is, one in which the row connection line is poled positively and the column connection line is poled negatively, will effect actuation of the bistable relay to the rest condition.

Further, the source of control pulses (not shown) that feeds control potential U in the desired polarity to the matrix illustrated in FIG. 1, also limits control potential U to a value that is greater in amplitude than Zener voltage $U_z$, but which is lower than three times Zener potential $U_z$. Then, assuming that switches Y2 and X2 are closed, and that the control potential source is connected such that its positive output is connected to column terminal 2 and its negative output is connected to row terminal 2, an electrical connection will be effected between Y2, S2, A22, G222, Z2′, Z21, M2, *m*2 and X. Thus, the exciter winding of relay A22 will be energized with a current pulse, which, as defined above, actuates the relay to the operating condition. However, it is seen that the circuits defined by the parallel branches of column connection line S2 are not completed, because of the Zener diode configuration therein, relative to the applied control source. For example, the parallel circuits defined by *y*2, S2, A32, G322, Z31, M3, Z32, G331, A33, A23, G232, Z2′, Z21, M2, *m*2, *x*2; and *y*2, S2, A12, G122, Z1′, Z11, M1, Z12, G111, A11, A21, Z212, Z21, Z2′, M2, *m*2, and *x*2, are not completed because three Zener diodes, Z31, Z32, and Z21; and Z11, Z12, and Z21, respectively, are non-conductive because the control potential U is less than three times Zener voltage $U_z$.

Assume that bistable relay A22 is to be actuated back to the rest position. Then, it is necessary to apply a control potential of opposite polarity relative to the control pulse that actuated relay A22 to the operating condition. Therefore, control pulse source U is repoled, so that its positive output is connected to terminal 2, and its negative output is connected to terminal 1. This is illustrated by the polarity conditions shown in parenthesis in FIG. 1. Then, assuming that switches X2 and Y2 are closed, the series connection including the exciter winding associated with relay A22, is completed between X2, S21, *m*2, M2, Z22, Z2′, G221, A22, S2, Y2. However, the parallel circuits or branches of row connection line Z2, are blocked by the series connection therein of three Zener diodes poled in blocking direction with respect to the control source. Therefore, control pulses are not applied to the exciter windings of the relays associated with said parallel circuits, and hence the particular stable states associated therewith are maintained.

Figure 2:
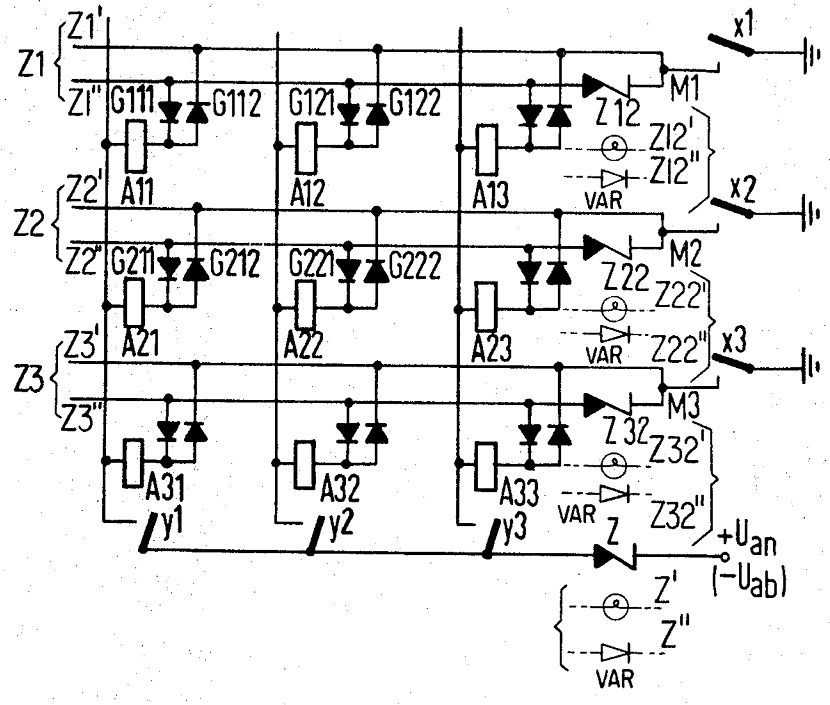
FIG. 2 is an electrical schematic diagram of another embodiment of the invention, wherein only one of the first and second associated row connection lines, comprises a switching element connected therein, and wherein a common switching element is provided for selective series connection to the column connection lines, and in addition

FIG. 2 shows another embodiment of the invention, wherein only one of the associated first and second row connection lines comprises a Zener diode. Thus, only second row connection lines Z1″, Z2″, and Z3″, include a series connected Zener diode, Z12, Z22, and Z32, respectively. Further, a common Zener diode Z is connected in series between one terminal of the source, and the common connection of parallel connected switches Y1, Y2, and Y3.

The Zener voltage of Zener diodes Z, Z12, Z22, and Z32, is equal to $U_z$. Further, the amplitudes of control pulses $+U_{an}$ and $-U_{ab}$, is greater than Zener voltage $U_z$ but less than twice Zener voltage $U_z$. Therefore, when switches X2 and Y2 are closed, to effect application of a control current pulse to the exciter winding associated with relay device A22, a connection is effected between ground, X2, M2, Z2′, G222, A22, S2, Y2, Z, and $+U_{an}$. However, since $U_{an}$ is less than twice Zener potential $U_z$, the parallel connected circuits, for example, the circuit defined between Ground, X2, M2, Z2′, G212, A21, A11, G111, Z1″, V12, M1, Z1′, G122, A12, S2, Y2, Z, $+U_{an}$ is not completed, because it comprises two Zener diodes, Z12, and Z, in series connection across a potential source that is less than twice Zener voltage $U_z$.

Therefore, it is seen that the relay windings that are connected in series with this electrical circuit (associated with relay devices A21, A11, and A12), are not energized. When a control pulse of opposite polarity, that is, $-U_{ab}$, is applied to column connection line S2, through switch Y2, and assuming that switch X2 is closed, Zener diode Z will be conductive in the opposite (low resistance direction). However, it will still be necessary that potential $U_{ab}$ be greater than Zener voltage $U_z$, but less than twice Zener voltage $U_z$, to effect conduction of series connected Zener diodes Z22 and Z, to effect operation of relay device A22 back to the rest position and to maintain the other relay devices connected in parallel circuits between Y2 and X2, non-responsive to the control pulse, $-U_{ab}$. As explained above, a positive potential applied to the column connection lines, effects operation of the associated relays from the rest position to the actuating position, and a negative potential effects actuation of the associated relay devices from the actuated position back to the rest position. These criteria are assumed, however, only in explanation of the invention and it is apparent that other criteria may be adopted.

The Zener diodes connected in the second row connection lines, are oppositely poled relative to Zener diode Z. Thus, in either conduction direction, that is, when the current flow is from a column connection line to a row connection line or from a row connection line to a column connection line, it is necessary that the Zener voltage of one Zener diode be exceeded by the control voltage ($+U_{an}$ or $-U_{ab}$). For example, only the Zener voltage $U_z$ of Zener diode Z must be exceeded to complete the connection between column connection line S2, and row connection line X2, when $+U_{an}$ is applied to column connection line S2, because Zener diode Z22 is then poled in its low-resistance conduction state.

On the other hand, although Zener diode Z is in its low-resistance conduction state, when control potential $-U_{ab}$ is applied to column connection line S2, Zener diode Z22 is poled such that Zener voltage $U_z$ must be applied thereto if it is to conduct; hence, the Zener voltage $U_z$ must be exceeded by the control potential $-U_{ab}$. Simultaneously, however, the parallel connected circuits associated with column connection line S2, comprise at least two Zener diodes Z12 and Z32 (for example), that are poled such that the Zener voltage $U_z$ of each must be exceeded before they conduct. Therefore, since the control potential $-U_{ab}$ is less than twice Zener potential $U_z$, it is seen that the parallel circuits are biased to the nonconducting state. Thus, the relay windings connected in said parallel paths are not excited by the control potential $-U_{ab}$.

The above description of FIG. 2 is based upon the assumption that $+U_{an}$ and $-U_{ab}$ are of the same amplitude, but of opposite polarity. However, Zener diode Z is not necessary, and may be deleted from the circuit illustrated, provided the amplitudes of control pulses $+U_{an}$ and $-U_{ab}$ are different. Thus, if the amplitude of control potential $+U_{an}$, is less than the Zener voltage of Zener diodes Z12, Z22, and Z32, and the amplitude of control potential $U_{ab}$ is greater than the Zener voltage $U_z$ but less than twice Zener potential $U_z$, it is possible to delete Zener diode Z, and still maintain the operating conditions described above, wherein only the connection path between selected row and column connection lines is completed, and parallel circuits associated therewith are not electrically completed.

Alternatively, varistors or discharge devices such as glow lamps may be substituted for the Zener diodes illustrated in FIGS. 1 and 2. For example, with reference to FIG. 1, Zener diodes Z11 to Z32 may be deleted and varistors or glow lamps, may be substituted therefor. In FIG. 2, the similar substitutions may be made for Zener diodes Z12, Z22, and Z32. That is, for example, the glow discharge device Z12′ may replace Z12 or the varistor Z12″ may replace Zener diode Z12 or glow discharge device Z12′. These alternative switching elements are shown in a bracketed relationship with Zener diodes in FIG. 2. The characteristics of a varistor are such that the resistance thereacross varies non-linearly and decreases with successive increases in potential. Thus, as the voltage across the varistor increases its resistance will decrease, and consequently the voltage across the series connected exciter winding will increase. Further, since the exciter winding of the relay is inductive, the current in the series path will gradually rise until it is sufficient to actuate the relay between bistable states.

Also, a discharge device such as a glow lamp may serve as the switching device, because it is non-linear and has a negative resistance range. When the glow lamp fires upon application thereto of a control potential of sufficient amplitude such that the threshold potential thereof is exceeded, resistance of the glow lamp will decrease and hence a greater voltage will appear across the exciter winding connected in series therewith, serving to actuate the relay from one of the stable states to the other. A control potential of opposite polarity will actuate the relay back to the initial stable state.

The criteria set forth relating to the Zener voltage and the amplitudes of the control pulses applied to the matrix, also holds for the embodiments of the invention wherein varistors or glow lamps are substituted for Zener diodes. Thus, it is seen that a control pulse must be applied across the selected row and column connection lines to actuate the varistor or glow lamp connected in series therewith, but it must not be greater than three times said threshold potential, so that the varistors or glow lamps connected in the parallel circuits will not be actuated and will consequently block the flow of current to the associated relay windings.

I claim:

1. A matrix to selectively actuate a plurality of relays associated therewith which comprises:

a plurality of first (Z1, Z2, Z3) and second (S1, S2, S3) coordinate connection lines, each of said plurality of first connection lines (Z1, Z2, Z3) comprising associated first and second connection conductors (Z1′, Z1″; Z2′, Z2″; Z3′, Z3″), a first source (+U; $+U_{an}$) of first control signals of predetermined polarity, a second source (−U; $-U_{ab}$) of second control signals of predetermined polarity opposite to the polarity of the first control signals, a relay exciter winding (A11 to A33) connected between each first (Z1, Z2, Z3) and second (S1, S2, S3) coordinate connection lines, said relay exciter winding having first and second end terminals, said first end terminal being connected to the associated second coordinate connection line (S1, S2, S3), said second terminal end being connected to the first and second connection conductors through oppositely poled diodes (G111, G112 to G331, G332), a bistable relay operatively associated with each of said relay windings (A11 to A33), actuable to a first stable state of operation in response to the first control signals and to a second stable state of operation in response to the second control signals, a bi-directionally conductive switching element (Z11 to to Z32) having a predetermined operating potential threshold connected between at least one of each of said associated first and second connection conductors and a common connection point, (M1, M2, M3), control means (X1 to X3, Y1 to Y3) connected to said first and second sources, said second coordinate connection lines (S1, S2, S3), and said common connection points to effect actuation of the associated bistable relays to one of said first and second stable states.

2. A matrix as recited in claim 1 further comprising a switching element (Z) connected between said first and second sources ($+U_{an}$, $-U_{ab}$), and said control means (Y1, Y2, Y3).

3. A matrix as recited in claim 1 further comprising a switching element connected between each of said associated first and second connection conductors.

4. A matrix as recited in claim 1 wherein each switching element has non-linear operating characteristics, and wherein the amplitude of said first control signals is different from the amplitude of said second control signals.

5. A matrix as recited in claim 1 wherein each switching element comprises a Zener diode.

6. A matrix as recited in claim 1 wherein each switching element comprises a discharge lamp.

7. A matrix as recited in claim 1 wherein each switching element comprises a varistor.

References Cited

UNITED STATES PATENTS

| | | | |
|---|---|---|---|
| 2,854,651 | 9/1958 | Kircher. | |
| 3,218,481 | 11/1965 | Lugten et al. ---- | 307—318 XR |
| 3,356,898 | 12/1967 | Dano ----------- | 307—318 XR |

DONALD J. YUSKO, Primary Examiner

U.S. Cl. X.R.

317—137; 340—176